No. 668,241. Patented Feb. 19, 1901.
S. W. WARDWELL, Jr.
MACHINE FOR WINDING FROM ROTATING SUPPLIES.
(Application filed Sept. 13, 1897.)
(No Model.) 5 Sheets—Sheet 1.

Fig. 1.

Witnesses:
J. G. Hinkel
A. E. Hansmann

Inventor
Simon W. Wardwell Jr.
by
Foster Freeman
Attorneys.

No. 668,241. Patented Feb. 19, 1901.
S. W. WARDWELL, Jr.
MACHINE FOR WINDING FROM ROTATING SUPPLIES.
(Application filed Sept. 13, 1897.)
(No Model.)
5 Sheets—Sheet 2.

Witnesses:

Inventor
Simon W. Wardwell Jr.
by
Attorneys.

No. 668,241. Patented Feb. 19, 1901.
S. W. WARDWELL, Jr.
MACHINE FOR WINDING FROM ROTATING SUPPLIES.
(Application filed Sept. 13, 1897.)
(No Model.) 5 Sheets—Sheet 3.

Witnesses:
J. G. Hinkel
A. E. F. Hansmann.

Inventor
Simon W. Wardwell Jr.
by
Parker Freeman
Attorneys.

No. 668,241. Patented Feb. 19, 1901.
S. W. WARDWELL, Jr.
MACHINE FOR WINDING FROM ROTATING SUPPLIES.
(Application filed Sept. 13, 1897.)
(No Model.) 5 Sheets—Sheet 4.

Witnesses: Inventor
Simon W. Wardwell Jr.
by
Attorneys.

THE NORRIS PETERS CO., PHOTO-LITHO., WASHINGTON, D. C.

UNITED STATES PATENT OFFICE.

SIMON W. WARDWELL, JR., OF PROVIDENCE, RHODE ISLAND, ASSIGNOR TO THE UNIVERSAL WINDING COMPANY, OF PORTLAND, MAINE.

MACHINE FOR WINDING FROM ROTATING SUPPLIES.

SPECIFICATION forming part of Letters Patent No. 668,241, dated February 19, 1901.

Application filed September 13, 1897. Serial No. 651,508. (No model.)

*To all whom it may concern:*

Be it known that I, SIMON W. WARDWELL, Jr., a citizen of the United States, residing at Providence, in the county of Providence and State of Rhode Island, have invented certain new and useful Improvements in Machines for Winding from Rotating Supplies, of which the following is a specification.

This invention relates to machines for winding from rotating supplies; and the object of the invention is to provide a machine which is adapted to take yarn, thread, or similar material from several cops that have already been wound in multiple and so rewind it that the resultant product shall combine all the strands contained in the multiple cops, so that each strand may be continuous throughout the product and all the strands lie flat and substantially parallel to each other. In order to do this, it is necessary to unroll the yarn or similar material from the supplying multiple cops, for if it were drawn over the end of the cops or package, as is done with single yarn, the product would be twisted, and consequently the strands would lie neither flat nor parallel. As the yarn used for the supply has been already wound in multiple, the weak spots in the separate strands have been eliminated, and they have been wound under such uniform tension that when the multiple strand is drawn from the supply there is little danger of breaking the single strands composing it. It follows, therefore, that if each multiple strand is wound without breaking it is safe to assume that the separate strands composing the multiple strand remain intact. In order, then, that each strand shall be continuous throughout the product or package, it is important, first, to insure that no undue strain is brought upon the various bodies of multiple strands; second, in case one of these bodies of multiple strands breaks to provide means whereby the winding shall be immediately stopped, so that the broken ends shall not run into the product or package being wound.

In order to wind from an unrolling supply, it is necessary to neutralize the effects of the momentum and inertia of the supplies. The winding-spindle on which the product or package is being formed must be started with a gradual acceleration until the full speed is attained, for if it is started suddenly the inertia of the supply will break the yarn. In order to stop the winding, the rotating supplies must stop coincidently with the product-cop or a very little later. If the supplies stop ever so little before the winding-spindle of the product, the yarns will break. If the supplies stop too late, they will "overrun" and there will be slack yarn to be taken up by hand or otherwise before the machine can be started. Should the winding-spindle be started before this slack is taken up, the winding-spindle will acquire its full speed before the supplies are started, and the inertia of the latter is so great that when the slack yarn tightens it breaks before the supplies can yield.

It is with the object of overcoming these and other difficulties that this invention is made; and it consists in the various features of construction and arrangement of parts having the general mode of operation substantially as herein specified.

In the accompanying drawings there is illustrated a preferred embodiment of the invention, and in said drawings—

Figure 1:
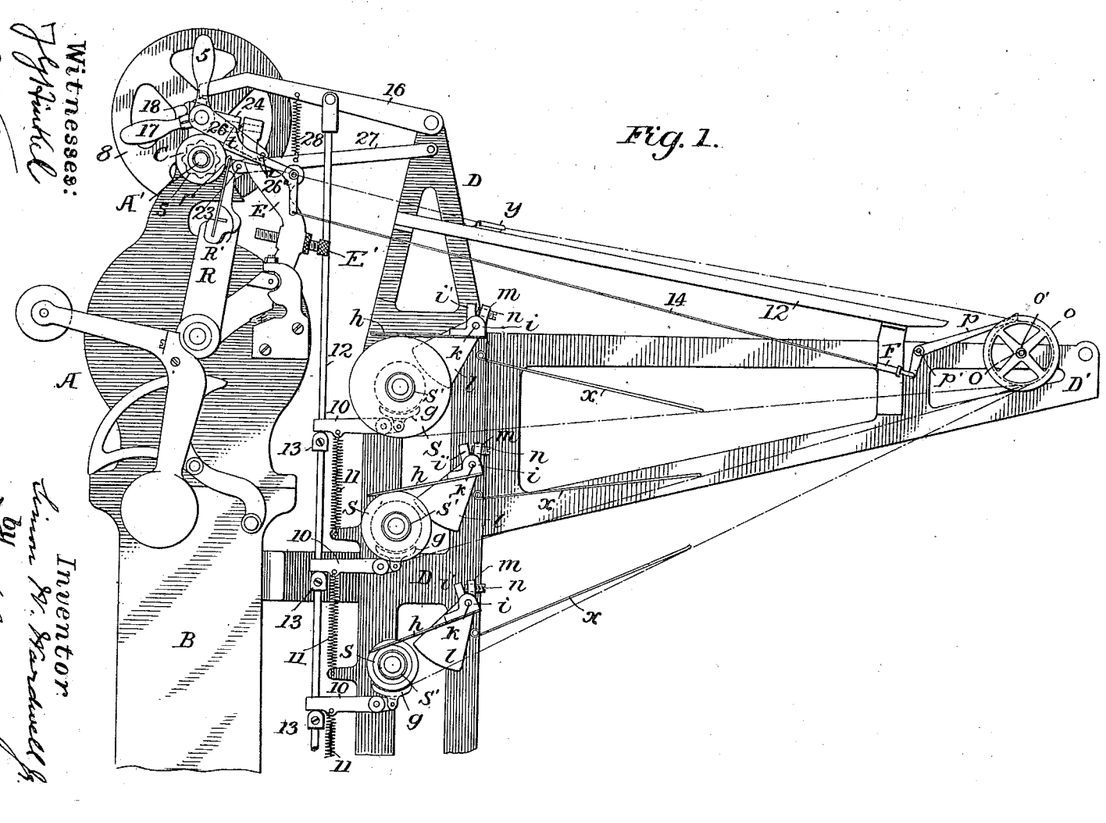
Figure 1 is a side view of so much of the machine as is necessary to an understanding of the invention.

In the drawings, A represents a winding-machine on which the product or cop is to be made, and this machine is shown as attached to a column B.

It is not deemed necessary to describe in detail the construction and arrangement of the winding-machine itself, as that may vary and may be, for instance, of the general character of the winding-machine shown in Patent No. 536,672, dated April 2, 1895, or No. 567,871, dated September 15, 1896, and comprises, essentially, so far as the present invention is concerned, a rotating spindle A' and a swinging frame R, carrying a traversing thread-guide R', having an eye or eyes $r$ and arranged to travel back and forth in front of the winding-spindle in a manner well understood in this class of winding-machines.

Figure 5:
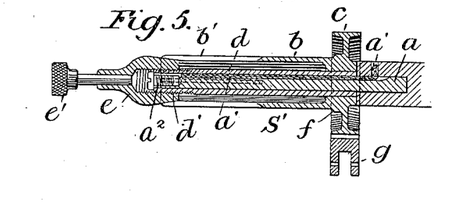
Fig. 5 is a sectional view of the supply-holder.

Attached to the column B is a frame D, which supports the operating mechanism, and mounted on this frame are the cops S of multiple yarn used for the supply, these cops being held on supply-holders S', and there may be any desired number of these supplies, three being shown in the present instance. These supply-holders S' (shown enlarged in Figs. 5 and 6) consist, essentially, of a stem in the form of a sleeve $b$, integral with a brake-disk $c$ and concentrically attached to a bushing $d$, which rotates on a pin or spindle $a$, supported in the frame D. This pin or spindle $a$ is grooved longitudinally to receive absorbent material $a'$, that shall retain oil to maintain the lubrication of the supply-holder, and there is a screw $a^2$ at its outer end the head of which serves to keep the bushing on the spindle. The bushing $d$ has an external screw-thread $d'$ at its outer end, adapted to receive the similar internal threads in the tapered plug $e$. The supply-holder sleeve $b$ has at its end inner bearing-faces corresponding to the taper face of the plug $e$, and it is also provided with longitudinal slots $b'$, cut in its shell, so that as the plug $e$ is screwed onto the bushing $d$ the ends of the sleeve are expanded. The plug $e$ is provided with a suitable handle $e'$, whereby it may be readily operated. On the hub of the brake-wheel $c$ there is an inclined or tapered portion $f$, which serves to center tubes that are larger than the body of the sleeve. The supply-cop on its tube is pushed onto the supply-holder S' until the end of the cop-tube bears on the taper $f$, and the end of the sleeve $b$ is then expanded by adjusting the plug $e$ until it binds the cop-tube sufficiently to hold it firmly on the sleeve and to prevent it from slipping thereon. It will be seen that this construction is simple, readily adjusted, and serves to securely support the supply-cops, and the brake-wheel, in connection with the brake devices hereinafter described, controls the movements of the cops.

Figures 6, 7, 9, 10, 11:
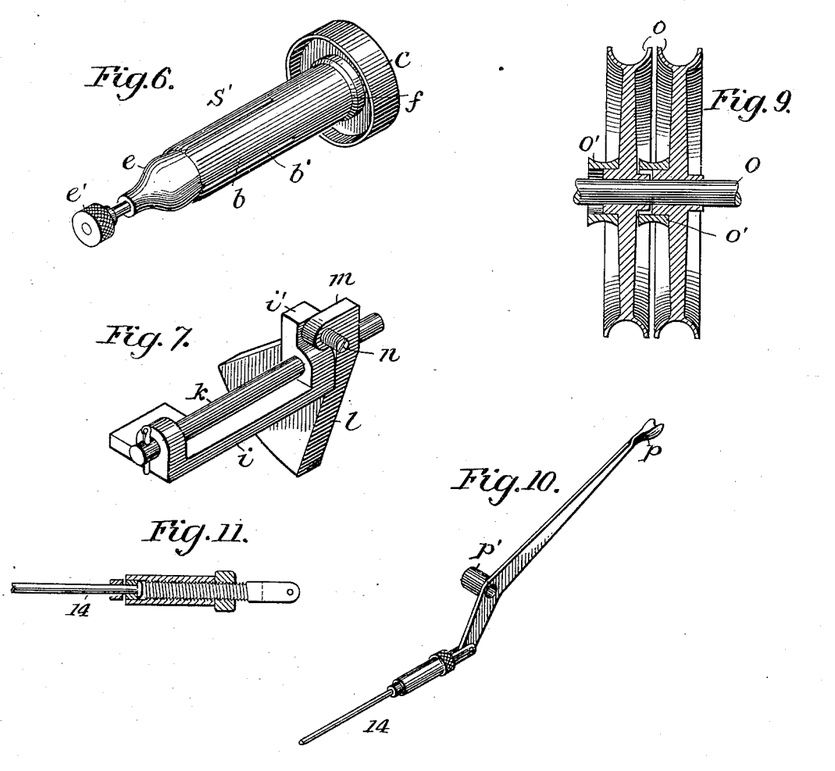
Fig. 6 is a perspective of the same.
Fig. 7 is an enlarged detail view of a part of the automatic tension device.
Fig. 9 is an enlarged vertical section of the guide-wheels.
Fig. 10 is an enlarged perspective of one of the spoons.
Fig. 11 is a section of the extensible connection between the spoons and stopping device.

While the brake-wheel controls the starting and stopping of the supply-cops, it is desirable to provide them with tension devices which shall act to automatically lessen the tension applied to the yarn as the supply-cops decrease in diameter to compensate for the increased resistance of the supply-cops to rotation due to their decreasing diameter. Mounted in the frame D is a pin or shaft $k$, on which is pivoted a frame $i$, having a lug $i'$, and to this frame is attached a plate $h$, which bears upon the top of the supply-cop. These plates $h$ are so located relative to the supply-cops that when the latter are first placed in position and are full of yarn the plates are horizontal and exert their maximum pressure on the top of the cops. As the yarn is unrolled from the cops S they decrease in diameter and the plates $h$ fall, exerting a constantly-decreasing pressure or tension on the cops. The weight of the plates alone may be sufficient to produce the necessary tension when the yarn is running at high speed; but it is desirable to increase the weight to produce the necessary tension when the yarn is running more slowly, and to do this a weight $l$ is pivotally mounted on the pin $k$ and is provided at its upper part with a lug $m$, and the screw $n$, passing through the lug, impinges on the corresponding lug $i'$ on the frame $i$, and by turning the screw $n$ the weight $l$ may be raised or lowered, thereby increasing or diminishing its effect on the plate $h$. This simple construction provides a satisfactory tension device for the unrolling cops, in which the tension is automatically decreased to adjust itself to the increasing speed of the yarn as it is unrolled from the cops and wound upon the cop on the winding-spindle A', which latter may have a uniform speed of rotation.

Figure 8:
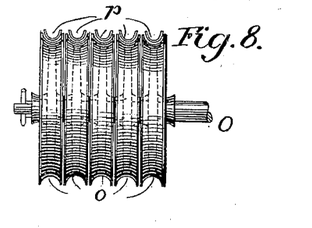
Fig. 8 is a front view of the guide-wheels and spoons.

From the various supply-holders S the multipled yarns pass to the guide-wheels $o$, loosely mounted on a shaft O, supported in an extension D' of the frame D. Sometimes the strands will become displaced from the periphery of the wheels $o$, which are shown as circular in cross-section, and if so they get in between the hubs of the wheels and become dirty and are liable to break and clog the bearings. To prevent this, a guard $o'$ is placed on the hub of each pulley, which guard extends over the hub of one of the adjacent pulleys, so as to catch the strands that are displaced, and these guards are grooved on their peripheries, so as to prevent the strands from working into the space between the guard and the adjacent pulley. This feature is further illustrated in Figs. 8 and 9.

From the guide-wheels $o$ the multiple yarns pass over the spoons $p$, which are pivotally supported at $p'$ on the frame extension D' and the free ends of which extend over the grooved wheels. Arranged between the spoons and the winding-cop is a shelf or platform 12, over which the multiple yarns pass to the traversing guide R' and onto which the threads fall when they become broken and are prevented from being entangled with the devices below the shelf. This shelf is mounted on the frame D and its extension D', and mounted on the shelf is a piece of felt $y$, under which the multiple yarns pass and which tends to keep the threads from tangling and if any of them break or the supply is exhausted to hold them in place on the shelf 12, ready for piecing. Furthermore, the yarns being wound attain sufficient momentum to throw them out of the eye or eyes when the machine is stopped, the tension on the yarns sometimes being slight enough to allow this, and the felt $y$ serves as a secondary tension to overcome the momentum of the winding strands and maintain the yarns at the eye under sufficient tension to hold them in place. From the shelf the multiple yarns pass through the eye or eyes $r$ of the traversing guide R' and are wound upon a cop C, supported on the winding-spindle A' of the winding-machine.

Figure 12:
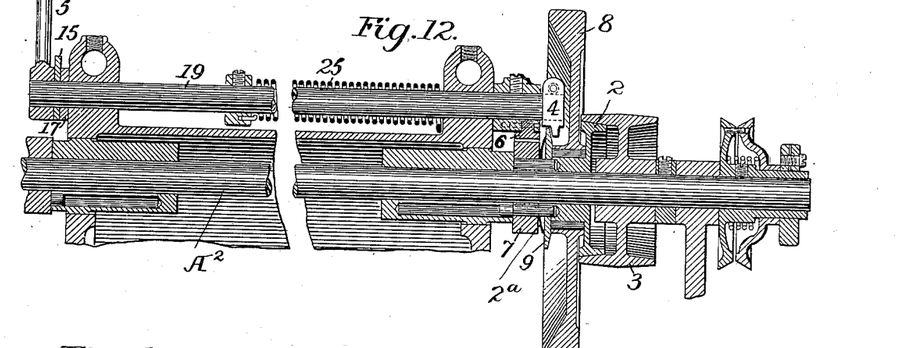
Fig. 12 is an enlarged section showing the clutch and connecting mechanism for operating the same and operating the brake on the winding-spindle.
Figure 14:
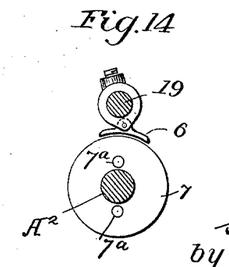

The devices for stopping and starting the winding-spindle are in some respects similar to those shown in Patent No. 567,871, and there is a driving-pulley 3 (see Fig. 12) loosely mounted on the driving-shaft $A^2$, which is thrown into connection with said shaft by means of a friction-clutch. While various forms of clutches may be used, there is shown a clutch portion 2, movable longitudinally on the shaft $A^2$, but rotating therewith, and which is under the stress of a spring $2^a$, tending to cause it to engage the driving-pulley, and the clutch is withdrawn from engagement with the pulley by a dog 4, acting on the beveled flange 9 of the clutch. The part 2 thus by its change of position acts to stop or start the machine, and I therefore term it the "stopping and starting device." The dog 4 is mounted on a rod 19, supported in the frame of the machine, and also mounted on this rod is a brake 6, arranged to bear upon the brake-wheel 7 on the shaft $A^2$. Connected to the rod 19 is a handle 5, provided with a small plate or cam 15, and also mounted on the rod 19 is the auxiliary lever 17, provided with a toe or cam 18. Also mounted on the rod 19 is a spring 25, which tends to turn the rod to throw the dog 4 into engagement with the flange 9 of the clutch. Mounted in connection with the driving-shaft $A^2$ and in this instance on the hub of the clutch 2 is an inertia-wheel 8, which is adapted to rotate on said hub. In the hub of the inertia-wheel 8 are several grooves $8^a$, and in these grooves are rolls $9^a$, and the bottoms of these grooves are slantingly related to the periphery of the clutch-hub, rendering the said grooves deeper at one end than at the other, so that when the shaft $A^2$ and the winding-spindle rotate in their forward direction the rolls bind between the clutch-hub and the inertia-wheel, carrying the latter with the spindle and shaft. Arranged in connection with each roll $9^a$ is a spring or similar yielding device $9^b$, which keeps the rolls in contact with the periphery of the clutch-hub and the bottom of the groove in the wheel, thus preventing the rolls from falling away or chattering. The brake-wheel 7 is provided with pins $7^a$, taking into recesses in the hub of the clutch 2. With this construction in order to start the machine, assuming the driving-pulley to be rotating, if the clutch were thrown into connection with the pulley and the machine started abruptly, attaining its full speed too suddenly, the multipled yarns not being strong enough to overcome the inertia of the supplies are liable to break, and by applying the inertia-wheel to the clutch the inertia of the clutch and wheel is such that the clutch when it is thrown into working position refuses to act immediately, but slips in the driving-pulley and holds back the spindle A' and shaft $A^2$, which spindle and shaft are integral, causing them to come to the requisite speed with an approximately uniform acceleration. When the machine stops, the dog 4 being thrown into engagement with the clutch by the spring 25, the inertia-wheel 8 is free to rotate on the hub of the clutch through the medium of the rolls $9^a$, and thus the stress upon the shaft $A^2$, due to the momentum of the inertia-wheel, is eliminated and strain to which the machine would be subjected if the inertia-wheel were rigidly attached to the shaft or hub is avoided. Furthermore, as the clutch 2 is withdrawn from the driving-pulley by the dog 4 simultaneously therewith the brake 6 is applied to the brake-wheel 7, and the shaft $A^2$ and its spindle are immediately stopped, the brake being sufficient to overcome the momentum of the shaft, while the momentum of the inertia-wheel does not affect the shaft, as above explained. This brake 6 and brake-wheel 7 are illustrated in Fig. 14, and it will be seen that the brake 6 on the shaft 19 is arranged so that when it is applied to the brake-wheel 7 on the shaft $A^2$ the direction of rotation of the brake-wheel is such that the brake being brought in contact with the disk through the medium of the spring 25 the spring and disk coact and cause a sort of toggle-joint action, thereby causing the brake to press quickly and tightly against and positively stop the rotation of the spindle to which the brake-wheel is attached, and this is an important feature, especially in high-speed machines, as by this arrangement the motion of the shaft and its attached spindle can be almost instantly stopped. Thus with this construction the machine can be gradually started without danger of breaking the multipled yarns, and the spindle can be instantly stopped and the spindle-shaft relieved of the momentum of the inertia-wheel, so that if perchance a strand breaks the spindle can be stopped before the broken end is wound thereon.

I have designated the wheel 8 as an "inertia-wheel," and by that I mean a wheel or equivalent member mounted and connected to the parts so that when the parts are started to rotate the inertia of the wheel tends to retard the starting, and whereas in the present instance the combined spindle and shaft A' A² is normally stationary while the driving-pulley may be rotating loosely on the shaft when the clutch is thrown into working position the pulley has to overcome not only the inertia of the shaft and clutch, but also the inertia of the wheel, so that the shaft will not attain its full speed as quickly as it would without the inertia-wheel, but the speed will be attained under a substantially uniform acceleration and in the present instance would start the supplies rotating without undue strain. So, too, the inertia-wheel in the present instance is so mounted on its support or driving member that when that driving member stops the wheel can continue its rotation under its momentum without rotating its supporting member, which in the present instance is the clutch connected to rotate the shaft A², and thus the strain upon the shaft by the momentum of the wheel if it were rigidly attached thereto is removed.

So far the stopping and starting device has been described only as being operated by the handle 5, and the automatic stopping devices will now be described. Mounted on the rod 19 is an arm 24, having at its end a hook 21, and engaging with this is a hook 22, mounted on the detent-lever E, which is pivotally mounted on the frame of the winding-machine in the usual way and which tends to hold the rod 19 in such a position as to allow the clutch 2 to engage the driving-wheel, the dog 4 and brake 6 being held under the stress of the spring 25. When, however, the detent-lever E is operated to disengage the hooks 22 21, the rod 19 is turned under the influence of the spring, applying the brake 6 and the dog 4 to operate the clutch and stop the machine. This detent-lever E in this class of winding-machines is operated in various ways—as, for instance, when the winding cop or product is full the frame R, which supports the traversing eye or eyes R', comes in contact with an adjustable screw E', mounted on the detent-lever—and other means for operating the detent-lever may be used which form no part of the present invention.

The spoons $p$, as above indicated, are arranged over the guide-pulleys $o$ in such a manner that the multipled strands pass over the spoons, holding them in the position shown in Fig. 1 during the operation of winding; but if any one of the strands breaks the spoons being released from the strain of the strands will move upward and by means of its connecting devices instantly stop the winding-spindle.

The winding-spindle A', on which the cop C is placed, is provided with a series of flutes or corrugations $s$. Pivotally connected to the detent-lever E is a series of stopping-levers $t$, and one of these levers is attached to each one of the spoons $p$ by means of rods or wires 14, which rods or wires are provided with an extensible connection F, Figs. 1 and 11, so that they can be properly adjusted. The arrangement of these members is such that when the spoons $p$ are held down in their normal position by the strands the levers $t$ are held up away from the corrugations $s$ on the spindle; but if any one of the strands breaks or becomes disarranged, allowing the spoon to fly upward, a lever $t$ falls and by engaging with the revolving corrugations $s$ forces the detent-lever E back, releasing the arm 24 and allowing the stopping mechanism to operate.

Mounted on the frame D is an arm 27, carrying a pin 23, which extends under the stopping-levers $t$, so that when the arm 27 is raised it carries with it the levers $t$, and through the wires 14 depresses the spoons $p$ into position ready to thread the machine or readjust the strands that have become broken or disarranged. Also mounted on the frame D is a lever 16, which is connected to the arm 27 by the spring 28, and this lever is provided with an indentation 20 at its free end. When this lever 16 is down, as indicated by dotted lines, Fig. 2, the end of the lever locks the cam or plate 15 and prevents the handle 5 from being moved forward to start the machine, and in order to start the auxiliary lever 17 is lifted and the toe or cam 18, connected to said auxiliary lever, engaging the end of the lever 16 raises it to the position shown in full lines, Fig. 2.

The lever 17 is free to turn on rod 19, and the hub of the lever 17 has a cam 18 formed on its edge for the purpose of raising the lever 16 for operating the brakes $g$ on the supply-holders S'. Working in conjunction with the cam 18 is a cam-plate 15, attached to the handle 5. Prior to starting the winding the lever 17 is in its lowermost position 17', (indicated in dotted lines, Fig. 2,) with the free end of the lever 16 resting on the cam 18, (also shown in dotted lines, Fig. 2.) The cam-plate 15 is so attached to the handle 5 that when the latter is disengaged from the detent-lever E it is so related to the lever 16 that the handle 5 cannot be moved to start the winding until the lever 16 is lifted out of its way. In order to do this, the lever 17 is raised from its dotted position 17' to the position indicated in full lines, Fig. 2, its cam 18 raising the free end of the lever 16, and when the lever 17 and the lever 16 have reached the upper position, (indicated by the full lines in Fig. 2,) the toe of the cam 18 engages the indentation 20 at the extremity of the lever 16, causing the lever 17 to be sustained in its upper or full-line position. When the handle 5 is moved to release the clutch 2 and allow it to be operatively connected with the pulley 3, the cam-plate 15 raises the free end of lever 16, allowing the toe of the cam 18 to be disengaged from the indentation 20, so that the lever 17 drops back into its lowermost or dotted position.

Rigidly connected with the handle 5 is an arm 26, carrying a rod 26ª, which is adapted to act upon the arm 27, thereby moving the pin 23 away from the levers $t$ $t$, leaving them free to fall.

When the stopping-levers $t$ or any one of them come in contact with the corrugations $s$, as before stated, the detent-lever is moved backward, disengaging the detents or hooks 21 and 22. The arm 26, moving in conjunction with the rod 19, under the action of the spring 25, rises, carrying with it the pin $26^a$, thus allowing the spring 28 to act to raise the arm 27 and with it the pin 23. The latter coming into contact with the stopping-levers $t$ raises them, thus depressing the spoons $p$, as above stated. The position of the arm 26 is so adjusted that the winding-spindle starts before the pin 23 is sufficiently depressed to let the levers $t$ come in contact with the corrugations $s$, and before this happens the tension on the strands is sufficient to operate through the spoons $p$ and sustain the levers $t$ in position away from the corrugations.

In order to stop the supplies S and prevent them from overrunning when the winding-spindle is stopped, brakes $g$ are arranged to bear on the brake-wheels $c$ of the supply-holders and may be attached to levers 10, which are under the stress of the springs 11 tending to apply the brakes. The brakes are withdrawn by means of a rod 12, connected to the lever 16 and provided with collars 13, engaging the free ends of the brake-levers. When the machine is running, as shown in Fig. 1, the lever 16 rests upon the cam 15, and the rod 12, by its collars 13, holds the brakes $g$ out of contact with their brake-wheels; but as soon as the stopping device is operated, as above described, the lever 16 falls to the position shown in dotted lines, Fig. 2, and the rod 12 is moved downward, allowing the springs 11 to quickly apply the brakes $g$ to the supply-holders. It will thus be seen that each brake $g$ is independently operated by its spring 11 to engage its corresponding brake-wheel controlling its particular supply and that all the brakes $g$ are released simultaneously when the rod 12 is moved upward by the lever 16. This arrangement is important in high-speed machines, as it is almost impossible to arrange a series of brakes controlled by a single means and applied to a series of devices to have them operate simultaneously and quickly to stop the devices, as slight variations in the form or arrangement of the parts will prevent a uniform pressure being applied to all the devices, while with my arrangement each supply receives the benefit of the pressure of an independent device applied to its particular brake and is stopped instantly. It will thus be seen that if any one of the strands breaks the spoon $p$ rises, the stopping-lever $t$ falls and engages one of the corrugations $s$, the detent-lever is moved, releasing the arm 24 and allowing the springs 25 to apply the brake 6 and disconnect the clutch 2 by means of the dog 4, and the balance-wheel moves on without affecting the winding-spindle, while the spring 28 operates upon the arm 27 to lift the stopping-levers by the rod 23 and set the spoons in position for threading, and the lever 16 falls, moving downward the rod 12, allowing the brakes $g$ to be applied to the supplies, and thus the supplies are stopped almost simultaneously with the stopping of a winding-spindle, which, as before stated, is practically instantaneous.

Figures 3, 4:
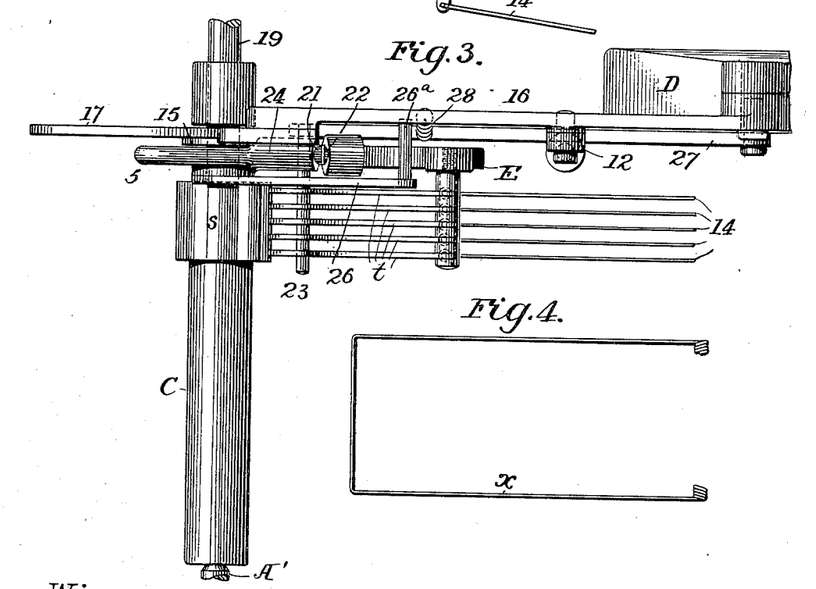
Fig. 3 is a plan view of the same.
Fig. 4 is a detail view of the compensator.

As it is impossible to obtain absolute uniformity of tension or regularity of rotation on the part of the supplies, and as these irregularities affect the stopping-levers and their connections, so that sometimes, yielding to the recurrent slacking of the threads, the spoons $p$ commence to vibrate, the levers $t$ acting in sympathy with them, and these vibrations being accentuated by the momentum of the vibrating members, one or more of the levers $t$ may be thrown in contact with the corrugations $s$ and cause the machine to stop. This is remedied by interposing between the supplies S and the spoons $p$ a compensator or yarn-tightener $x$, shown in the form of a light wire bail pivoted to the frame D, and its end, which is free to vibrate, bearing on the strands, taking up any slack that may occur and yielding with a temporary excess of tension over the normal, so that the objections just stated are overcome.

Figures 13, 15:
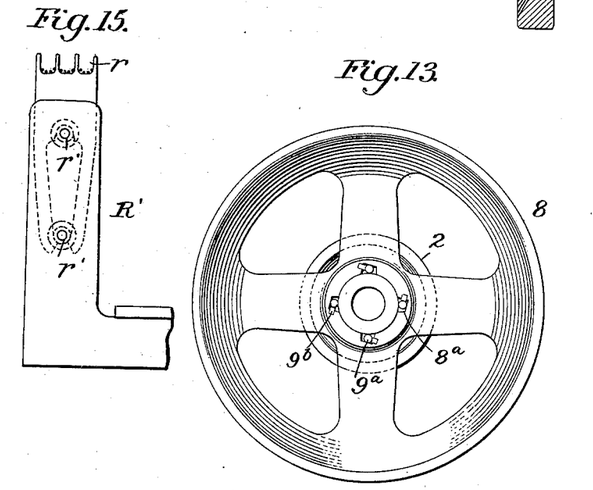
Figs. 13 and 14 are details of the inertia-wheel and brake-wheel.
Figs. 15 and 16 are front and side views of a guide with a series of eyes which may be used in place of the single-eyed guide shown in Fig. 1.
Figure 16:
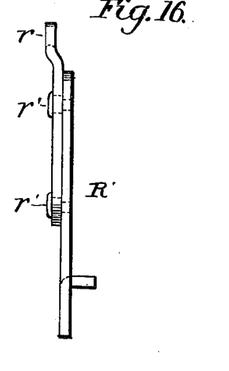
Figures 17, 18:
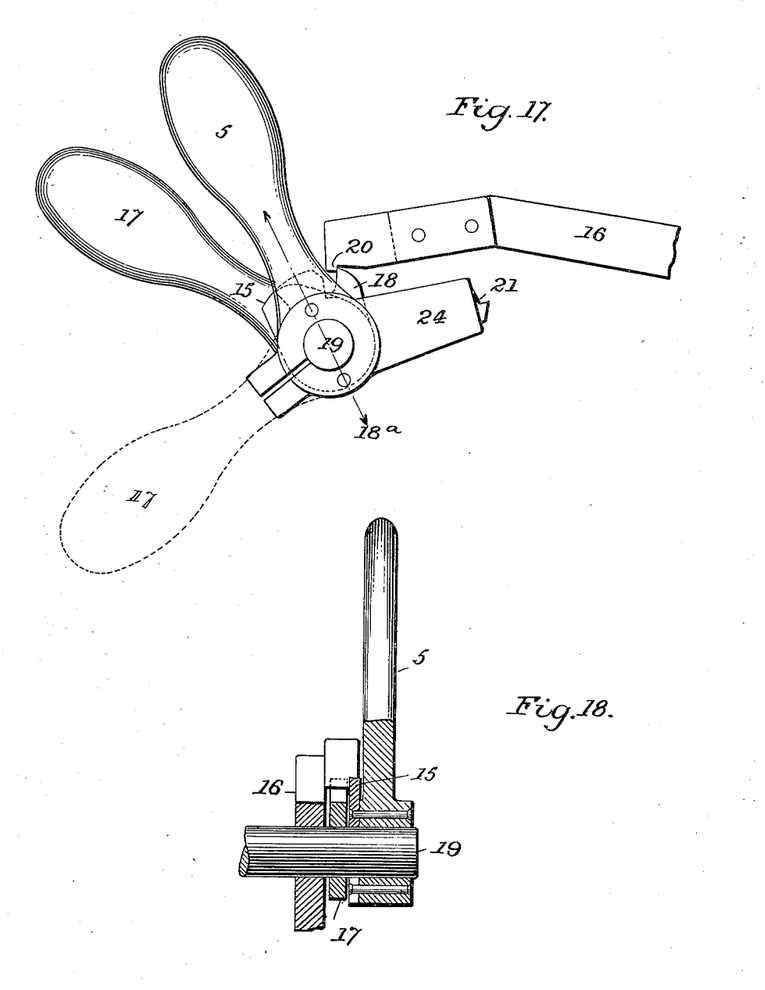
Fig. 17 is a side view, enlarged, of parts connected with the stopping device.
Fig. 18 is a section on the line 18ª, Fig. 17.

In Figs. 15 and 16 is shown a modified form of guide R'. If a large number of strands are run through one eye or channel, they will not lie flat, but those on the edges of the body of strands being wound will roll on top of the others. This is especially true of the strands on the side of the body toward which the traversing guide R' moves as it travels back and forth; but up to a certain number of strands there is no such trouble, so that if the larger body of yarns can be subdivided into smaller bodies and each of these be provided with a separate guide or eye the final product will be better laid on the product cop than if all the strands were drawn through a single eye. Fig. 1 shows the machine provided with a single eye, while Figs. 15 and 16 show a guide with a series of eyes and show the method of attachment to the machine. The guide R' has two pins or studs $r'$ in it, adapted to slots in the eyepiece $r$, so that the latter can be readily removed when desired.

In order that the essence and scope of the invention may be better understood, the sequence of operations to be performed from the time the cops of multipled yarns are placed on their supply-holders S' to the time the product-cop C is finished will be described.

Figure 2:
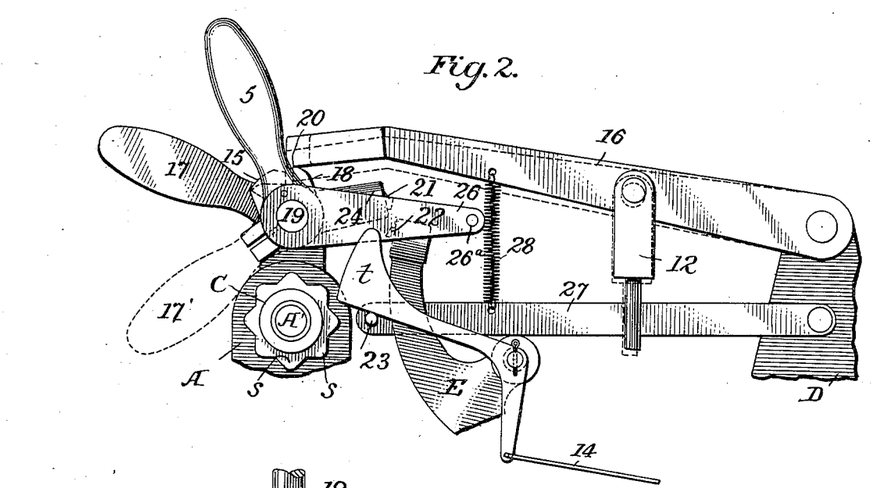
Fig. 2 is an enlarged side view of the automatic stop devices.

When not in operation, the parts of the machine should be in the following-described positions: The handle 5 is in its extreme back position, as indicated in Fig. 2. The dog 4, Fig. 12, has withdrawn the clutch 2 from the pulley 3, so as to dissever the active connection between the pulley and the winding-spindle. The driving-pulley 3 is constantly rotating. The arm 26 holds the pin $26^a$ in its upper position, thereby allowing the spring 28 to act on the arm 27 and through the pin 23 elevate the levers $t$, thus depressing the spoons $p$ and leaving them in position to thread, as heretofore described. The auxiliary lever 17 is down, as shown by the dotted lines in Fig. 2, and the lever 16 is also down, as indicated by the dotted lines, so that the collars 13 are withdrawn from the levers 10 and allow the brakes $g$ to act on the brake-wheels $c$ of the supply-holders S' to prevent their rotation. The tension-plates $h$ are at their lowest points, resting on the supply-holder sleeves $b$.
To prepare the machine for winding, the several cops of multipled yarns are placed upon their supply-holders, each tension-plate being raised to admit its cop. The cops are pushed onto their supply-holders until the end of the cop-tube reaches and, if larger than the sleeve $b$, centers itself on the tapered portion $f$ of the supply-holder. The plug $e$ is then forced into the sleeve $b$, expanding the slotted end thereof, fastening the supply to its holder, as heretofore described. The supplies having been placed in position and properly secured, the handle 17 is raised and the toe 18 engages with the end of the lever 16, raising it sufficiently to withdraw the brakes $g$ from their supply-holders, leaving them free to revolve. The end of the toe 18 engages with the notch 20 in the end of the lever 16 and is held up, the two levers thereby coöperating to restrain the brakes from the supply-holders and permit the lever 5 to be moved forward. The supplies being now free to rotate, the various bodies of multiple yarns are drawn forward under the compensators $x$, around the pulleys $o$, over the spoons $p$, under the felt $y$, and through the eye or eyes $r$ of the thread-guide R'. The ends are then so wrapped around the cop-tube on the winding-spindle as to hold them fast when the winding is started. The operative after making sure that there is no slack between the supplies S and the pulleys $o$ moves the lever 5 forward, carrying with it the plate 15, which further raises the lever 16 and releases 17, allowing it to fall back. The lever 5 carries with it the arms 24 and 26 and with the latter the pin $26^a$. Before this pin touches the lever 27 the brake 6 is withdrawn from the brake-wheel 7, leaving the winding-spindle free to rotate, and the dog 4 is withdrawn from the flange 9, thereby allowing the clutch 2 to contact with the pulley 3. The tendency of the clutch is to immediately engage with the pulley 3, but it is held back by the inertia of the wheel 8 until the latter gets under way, and with it gradually attains the full speed of the driving-pulley 3. After the winding has started and the yarns being wound are under sufficient tension to maintain the levers $t$ in position away from the corrugations $s$ the pin $26^a$ depresses the lever 27, causing the pin 23 to recede from the levers $t$, so that when any one of the supplies breaks or becomes exhausted the lever $t$, which it controls, can drop and cause the machine to stop, as described. The handle 5 is held in its forward position by means of the detent-lever E, through the medium of the lock-pins 21 and 22, until such time as the detent disengages the lever 24, thereby allowing the stopping devices to act. Suppose now that one of the strands of multiplied yarn breaks or that its supply has become exhausted. As soon as the end thereof passes from between the tension-plate $h$ and the supply-cop S (or its tube, if the yarn has run out) the tension on the yarn ceases and the spoon over which it passes flies up, causing the corresponding lever $t$ to drop and engage with the revolving corrugations $s$ and operate to stop the machine. In order to unite the broken ends or tie in the end of a new supply, the same sequence of operations is to be followed as in the original starting. The supply-brakes must first be released and the yarn run under the compensator, around the wheel $o$, over the spoon $p$, under the felt $y$, and tied to the broken end on the supply-cop and the winding started. As the cop increases in diameter the swinging frame R recedes from the product-cop, carrying with it the traversing guide R' until the cop attains its proper diameter, when it comes in contact with the adjusting-screw E', thereby forcing back the detent-lever E and causing the machine to stop, as described. The product-cop is then removed and a new one started.

What is claimed is—

1. The combination in a winding-machine, of a winding-spindle having a corrugated portion, rotating supplies, independent stopping devices therefor for arresting the winding, a detent E, yarn-controlled devices for disengaging said detent comprising guide-wheels $o$, spoons $p$ pivotally mounted adjacent to the wheels and adapted to be depressed by the yarn passing under tension from the guide-wheels to the winding-spindle, stopping-bars $t$ pivotally mounted on the detent E to engage, when dropped, with the corrugated portion of the winding-spindle to disengage the detent E, and adjustable connections intermediate the stopping-bars $t$ and the spoons $p$ whereby the stopping-bars are withheld by the depression of the spoons $p$ from engagement with the corrugated portions of the winding-spindle, and whereby the ends of the stopping-bars $t$ may be adjusted in position relative to said corrugations, substantially as described.

2. The combination in a winding-machine, of a winding-spindle having a corrugated portion, a stopping device to arrest the winding, a handle 5 by which to operate the stopping device, a detent-lever E to restrain the stopping device from acting, yarn-controlled devices for automatically causing the action of the stopping devices comprising the stopping-bars $t$ pivotally mounted on the detent-lever E and adapted to engage with the corrugated portion of the winding-spindle as it rotates, an arm 27 raised by the spring 28 to withdraw the ends of the stopping-bars from the corrugations when the winding is stopped and withhold them from engagement therewith until after the winding is started, and an arm 26 adapted to be moved with the handle 5 to depress the arm 27 and to maintain it in its depressed position during the winding to permit the stopping-bars $t$ to engage the rotating corrugations 3, 3, to cause the machine to stop, substantially as described.

3. The combination in a winding-machine, of a winding-spindle, a starting device for the spindle including a clutch and an inertia-wheel, and connections whereby to prevent the sudden and positive engagement of the starting device and spindle on starting, substantially as set forth.

4. The combination in a winding-machine, of a winding-spindle, a stopping device therefor, an inertia-wheel, and connections between the inertia-wheel and stopping device, whereby the inertia-wheel may continue to rotate after the stopping device has acted, substantially as described.

5. The combination in a winding-machine, of a winding-spindle, a starting and stopping device therefor, an inertia-wheel connected to said starting and stopping device so as to rotate therewith in one direction, and to rotate thereon when the device has stopped, and a brake for stopping the winding-spindle when the stopping device is operated, substantially as described.

6. In a machine for winding from rotating supplies, a positively-driven winding-spindle, a starting and stopping device for controlling the spindle, said device including means for positively arresting the spindle and overcoming the tendency of the winding-cop thereon to overrun due to its momentum, revolving supplies, brakes adapted to operate, each independent of the others, on the supplies to stop them, and connections between the brakes of the supplies and the starting and stopping device of the winding-spindle whereby the winding-machine is prevented from being started before the supply-brakes have been released and the winding-machine and supplies are stopped positively and simultaneously, substantially as described.

7. In a machine for winding from rotating supplies, means for securing the simultaneous positive stopping of the winding-spindle and supplies and for preventing the starting of the winding-spindle until the supply-brakes have been released, comprising a series of supplies, a series of brakes operating on the supplies, springs connected to the brakes for actuating them independently, a rod provided with collars for simultaneously releasing the brakes, a lever connected to the rod, a winding-spindle, a brake controlling the winding-spindle, a starting-handle, and connections controlling the brake and lever connected to the supply-brakes whereby when the winding-spindle is stopped the brakes on the winding-spindle and supplies shall be released and independently applied to the latter to simultaneously stop them, substantially as described.

8. In a machine for winding from rotating supplies, the combination with a shaft and winding-spindle carried thereon, of a brake controlling said winding-spindle, a series of supplies, a series of brakes for said supplies, springs independently actuating the brakes to apply the same, a rod and collars for simultaneously raising the brakes, a lever connected to the rod, a starting-handle having a stop-cam arranged to engage the lever so that the winding cannot be started, and an auxiliary lever provided with a cam for raising the first lever and releasing the supply-brakes and allowing the starting-handle to be moved, substantially as described.

9. In a winding-machine, the combination with a rotating supply-holder, of a friction-plate $h$ arranged to bear on the material being unwound and having a lug $i$, and a weight $l$ adapted to press said plate against the supply to act thereon with constantly-varying leverage, and a screw $n$ bearing on the lug, substantially as set forth.

10. In a winding-machine, a supply-holder comprising a sleeve having slots and internal bearing-faces at one end, a central bushing extending through the sleeve, and a plug supported by the bushing and adapted to said bearing-faces to expand the latter, substantially as described.

11. In a winding-machine a supply-holder comprising a sleeve having slots at one end, a central bushing extending through the sleeve, a plug for expanding the bushing and a central pin provided with a longitudinal slot adapted to receive an absorbent for containing a lubricant, substantially as described.

12. The combination with a guide-wheel for thread, of a laterally-extending hub, suitably grooved to catch the thread when displaced from the guide-wheel, to prevent it from falling on the guide-wheel shaft, substantially as described.

13. The combination with a winding-spindle, driving-wheel and clutch, of a wheel having a limited rotary movement independent of the spindle and the clutch, for retarding by its inertia the positive engagement of the clutch with the spindle on starting, substantially as and for the purpose described.

14. The combination with the spindle of a winding-machine and an independent driving-pulley having a normally constant speed, of a sectional clutch for connecting the two, and an inertia-wheel and connections between the same and one of the clutch-sections for retarding the rotation of the spindle on starting, with gradually-diminishing effect until the spindle attains the speed of the driving-pulley, substantially as described.

15. The combination with the spindle and clutch of a winding-machine, of a wheel and connections mounted to permit the wheel to turn with, but to a limited extent independent of, the spindle to retard the same as it is started and to maintain its motion for a limited time independently of the spindle when the latter is arrested, substantially as described.

16. The combination with a winding-spindle, a clutch, and independent wheel mounted to restrain the clutch action as the spindle is started, of means for permitting a limited independent rotation of the wheel as the rotation of the spindle is arrested, substantially as described.

17. In a winding-machine a spindle, a pulley carried on the spindle and adapted to rotate independently thereof, a clutch to connect said pulley and spindle, a wheel of relatively great mass mounted on said clutch and so adapted as to retard the motion of the spindle when the latter is started permitting it to attain its speed by slow degrees and further adapted to rotate freely on said clutch for a limited period when the latter with the spindle is stopped.

In testimony whereof I have signed my name to this specification in the presence of two subscribing witnesses.

SIMON W. WARDWELL, JR.

Witnesses:
CHAS. W. PEIRCE,
E. C. SMITH.